D. D. ROBERTS.
ADJUSTABLE HAND TOOL FOR FILING ROUND SURFACES.
APPLICATION FILED JAN. 20, 1921.
1,381,886. Patented June 14, 1921.
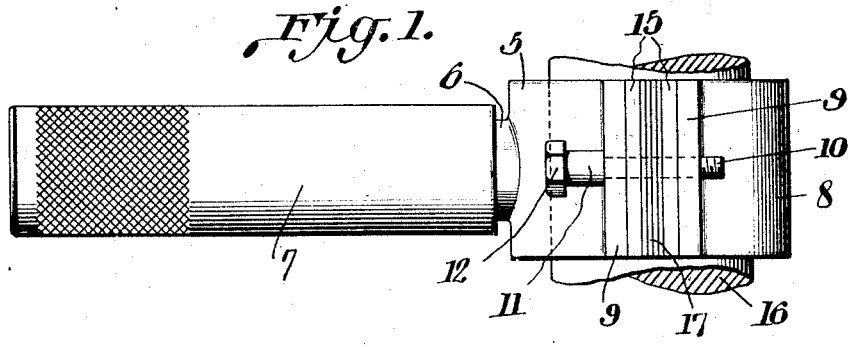
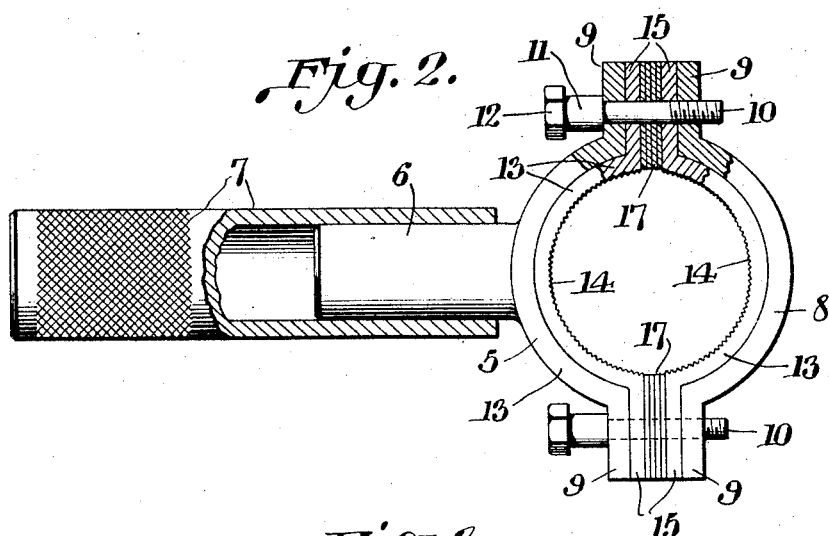
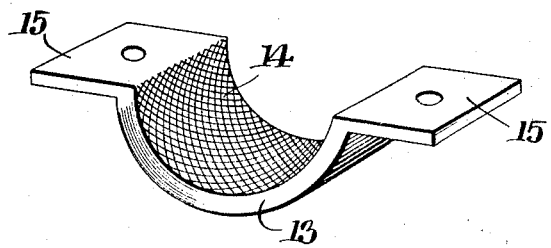
Inventor
Drew D. Roberts
By C. F. Belt
Attorney

UNITED STATES PATENT OFFICE.

DREW D. ROBERTS, OF PERRY, FLORIDA.

ADJUSTABLE HAND-TOOL FOR FILING ROUND SURFACES.

1,381,886.　　　　Specification of Letters Patent.　　Patented June 14, 1921.

Application filed January 20, 1921. Serial No. 438,709.

*To all whom it may concern:*

Be it known that I, DREW D. ROBERTS, a citizen of the United States, residing at Perry, in the county of Taylor and State of Florida, have invented certain new and useful Improvements in Adjustable Hand-Tools for Filing Round Surfaces, of which the following is a specification.

This invention relates to grinding and polishing and pertains especially to a hand-operated device or tool for filing circular surfaces, particularly shafting.

The object of the invention is to provide an improved lap or tool for rigidly clamping therein abrading plates of file members made to embrace a shaft during revolution or to be revolved around the same for truing or renewing the journal bearing portions of a shaft, and to furnish means whereby the tool may be applied to cylindrical metal work of various sizes.

A further object of the invention is to provide in a shaft grinding device circular filing plates having lateral securing flanges and an inner file surface operating on the shaft by revolving either the shaft or the device, and to furnish means for rigidly clamping the plates for embracing the shaft.

In the accompanying drawings forming part of this application:

Figure 1 is an elevation showing the application of the invention.

Fig. 2 is a sectional elevation.

Fig. 3 is a detail perspective view of one of the file plates.

The same reference characters denote the same parts throughout the several views of the drawings.

In carrying out my invention, I employ a pair of clamping members forming a circular clamp, one of which members as 5 has a central projection 6 telescoping a handle member 7, so as to place the handle centrally opposite the other of said members 8. Both of the members 5 and 8 have a pair of lateral flanges 9, one pair of said flanges, preferably those of the member 5, have a non-screw threaded hole, and the other flanges of the other member 8 having a screw hole for a bolt 10, which has an enlarged portion 11 forming a shoulder working against the flanges of the clamping member 5, and said portion 11 is provided with a nut head 12. The clamping members 5 and 8 are of the same size and of semicircular shape.

The filing members 13 are of semicircular shape and have an inner serrated surface forming a file face 14, and said members are provided with flanges 15 corresponding with the flanges 9. The bolts 10 extend through the flanges 15 which fit between the flanges 9. In order to vary the size of the circular opening of the abrading members 13, and the bearing of the file faces upon a shaft as 16, I provide a plurality of adjusting shims or washers 17 between the flanges 15. These shims are preferably composed of such material as will permit of their being compressed and expanded to a certain extent, to vary the circumferential bearing of the file faces on the shaft without operating the bolts, so as to provide for the difference in character of metal or other surfaces to be operated upon by said faces.

It will be understood that the circumference of the clamp may be increased and diminished according to the circumference of the surface to be cleaned or filed, by unscrewing the bolts from the flanges of the clamping member 8 so as to remove this member and one of the abrading members and permit removal and replacement of the shims or the use of variable numbers thereof without displacement of the other clamping member 5 and the other abrading member. The same arrangement and operation is also essential in placing and removing the clamp with respect to a mounted or journaled shaft, especially where such shafts are comparatively inaccessible.

I do not wish to limit the invention as to size and material or to its application, but reserve the right to make such changes and variations in the manufacture and practical utility thereof as may come within the scope of the appended claim.

Having thus described my invention what I claim as new and desire to secure by Letters Patent is:

In a device of the character described, a pair of separable circular clamping members having lateral flanges, a pair of circular file plates having like flanges and fitting within the clamping members, a plurality of adjusting shims between the flanges of the plates, a handle member projecting centrally from one of said clamping members, and screw bolts extending through all of said flanges and through the shims.

In witness whereof I hereunto set my hand in the presence of two witnesses.

DREW D. ROBERTS.

Witnesses:
M. T. HENDRY,
CHAS. P. DIAMOND.